US011256915B2

United States Patent
Li et al.

(10) Patent No.: US 11,256,915 B2
(45) Date of Patent: Feb. 22, 2022

(54) OBJECT TRACKING ACROSS MULTIPLE IMAGES

(71) Applicant: X Development LLC, Mountain View, CA (US)

(72) Inventors: Yueqi Li, San Jose, CA (US); Hongxiao Liu, Santa Clara, CA (US); Zhiqiang Yuan, San Jose, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 147 days.

(21) Appl. No.: 16/545,396

(22) Filed: Aug. 20, 2019

(65) Prior Publication Data

US 2021/0056307 A1 Feb. 25, 2021

(51) Int. Cl.
*G06K 9/00* (2006.01)
*G06T 7/246* (2017.01)
*G06T 7/00* (2017.01)
*G06K 9/62* (2006.01)
*G06T 15/00* (2011.01)

(52) U.S. Cl.
CPC ....... *G06K 9/00657* (2013.01); *G06K 9/6215* (2013.01); *G06T 7/248* (2017.01); *G06T 7/97* (2017.01); *G06T 15/00* (2013.01); *G06T 2200/08* (2013.01); *G06T 2207/30188* (2013.01); *G06T 2207/30242* (2013.01)

(58) Field of Classification Search
CPC .. G06K 9/00657; G06K 9/6215; G06T 7/248; G06T 7/97; G06T 15/00; G06T 2207/30242; G06T 2207/30188; G06T 2200/08
See application file for complete search history.

(56) References Cited

U.S. PATENT DOCUMENTS 7,558,762 B2   7/2009   Owechko et al.

OTHER PUBLICATIONS

Liu, Xu, et al. "Robust fruit counting: Combining deep learning, tracking, and structure from motion." 2018 IEEE/RSJ International Conference on Intelligent Robots and Systems (IROS). IEEE, 2018. (Year: 2018).*
Wang Z, Walsh K, Koirala A. Mango Fruit Load Estimation Using a Video Based MangoYOLO—Kalman Filter—Hungarian Algorithm Method. Sensors. Jun. 2019;18(12):2742. (Year: 2019).*

(Continued)

*Primary Examiner* — Vu Le
*Assistant Examiner* — Tracy Mangialaschi
(74) *Attorney, Agent, or Firm* — Middleton Reutlinger

(57) ABSTRACT

Implementations are described herein for utilizing various image processing techniques to facilitate tracking and/or counting of plant-parts-of-interest among crops. In various implementations, a sequence of digital images of a plant captured by a vision sensor while the vision sensor is moved relative to the plant may be obtained. A first digital image and a second digital image of the sequence may be analyzed to determine one or more constituent similarity scores between plant-parts-of-interest across the first and second digital images. The constituent similarity scores may be used, e.g., collectively as a composite similarity score, to determine whether a depiction of a plant-part-of-interest in the first digital images matches a depiction of a plant-part-of-interest in the second digital image.

11 Claims, 8 Drawing Sheets

(56) References Cited

OTHER PUBLICATIONS

Das, Jnaneshwar, et al. "Devices, systems, and methods for automated monitoring enabling precision agriculture." 2015 IEEE International Conference on Automation Science and Engineering (CASE). IEEE, 2015. (Year: 2015).*
Huang YH, Te Lin T. High-throughput image analysis framework for fruit detection, localization and measurement from video streams. In 2019 ASABE Annual International Meeting Jul. 2019 (p. 1). American Society of Agricultural and Biological Engineers. (Year: 2019).*
Fue, Kadeghe G., Wesley M. Porter, and Glen C. Rains. "Deep Learning based Real-time GPU-accelerated Tracking and Counting of Cotton Bolls under Field Conditions using a Moving Camera." 2018 ASABE Annual International Meeting. American Society of Agricultural and Biological Engineers, 2018. (Year: 2018).*
Babri, et al.; Feature Based Correspondence: A Comparative Study on Image Matching Algorithms; IJACSA; vol. 7 , No. 3; pp. 206-210; dated 2016.
Chan, et al; Physics-based Tracking of 3D Objects om 2D Image Sequences; IRCS Technical Reports Series; Institute for Research in Cognitive Science; 8 pages; dated Nov. 1994.
Chen, et al.; Multi-Object Tracking Using Dynamical Graph Matching; IEEE; 8 pages; dated 2001.
Duff, et al.; Physical Simulation for Monocular 3D Model Based Tracking; IEEE; 8 pages; dated 2011.
Duff, Damien; Visual Motion Estimation and Tracking of Rigid Bodies by Physical Simulation; University of Birmingham; 340 pages; dated Aug. 2010.
Ghobadi, Seyed; Real Time Object Recognition and Tracking Using 2D/3D Images; 141 pages; dated; Sep. 16, 2010.
Morwald, et al.; Self-Monitoring to Improve Robustness of 3D Object Tracking for Robotics; IEEE; 8 pages; dated 2011.
Rowan, et al.; An Efficient Multiple Object Vision Tracking System Using Bipartite Graph Matching; School of Software Engineering and Data Communication; 7 pages; dated Jan. 2004.
Zhong, et al.; Multi-Targets Tracking Based on Bipartite Graph Matching; Cybernetics and Information Technologies, Bulgarian Academy of Sciences; p. 78-87; dated 2014.

* cited by examiner

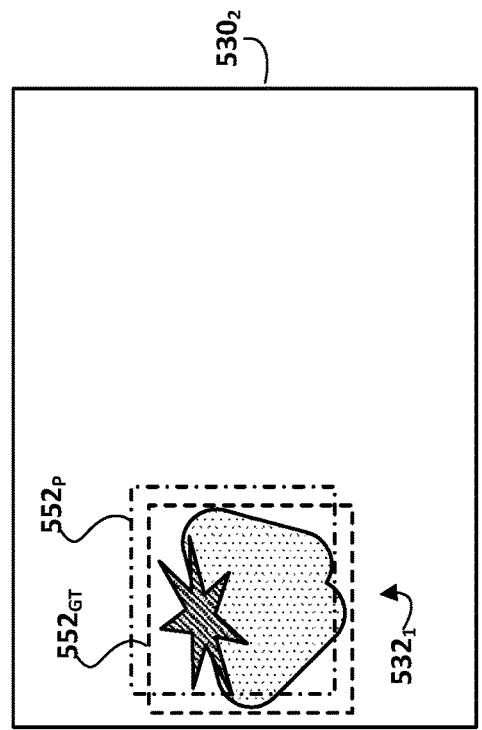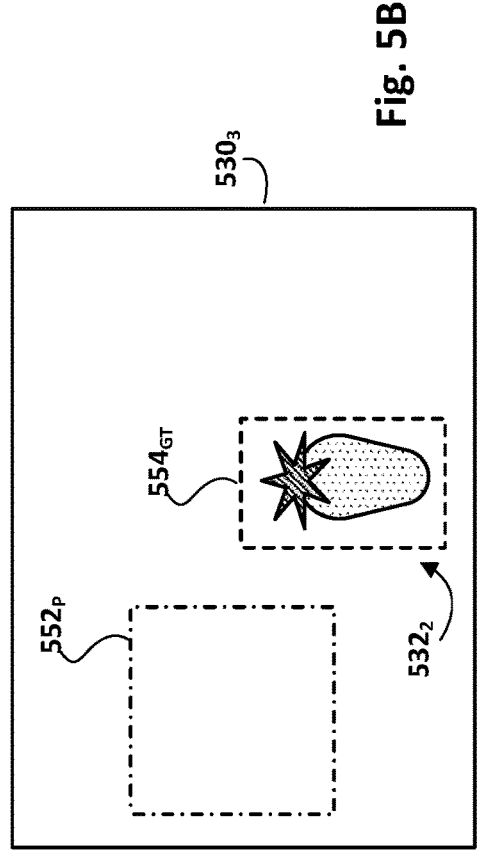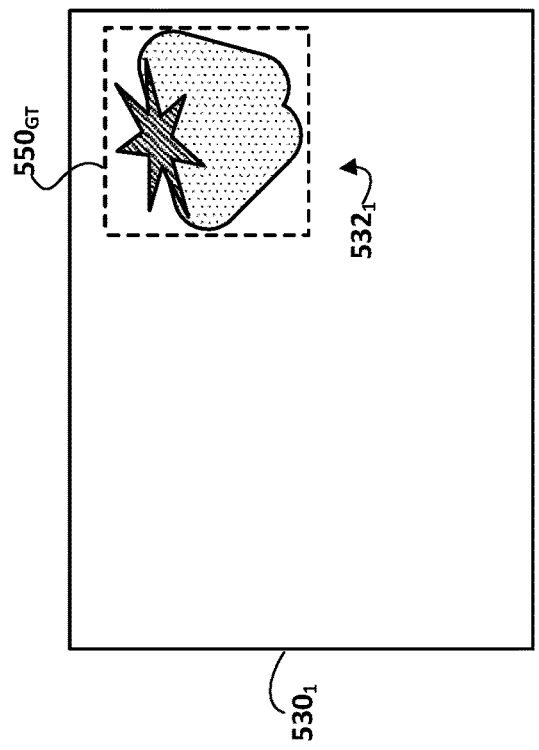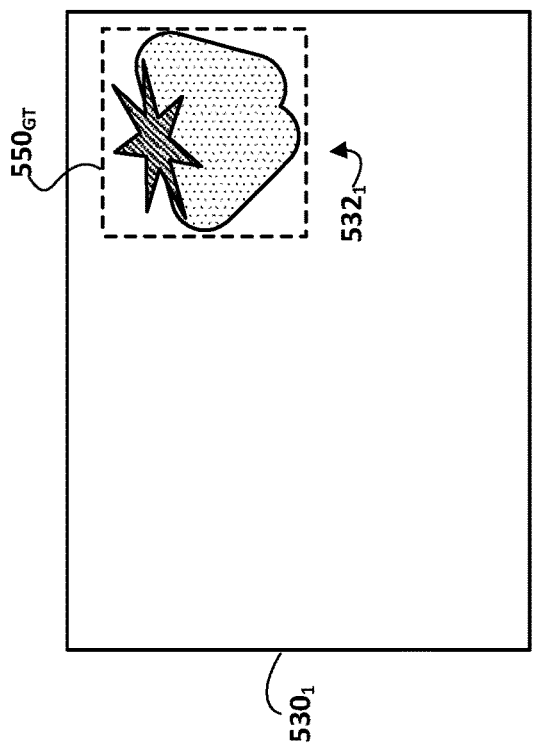
Fig. 5A
Fig. 5B

2019 PINOT NOIR SUMMARY HYPOTHETICAL FARMS

STATISTICS:

| | |
|---|---|
| TOTAL ESTIMATED FRUIT VOLUME: | 123456 KG |
| AVG FRUIT VOLUME: | 150G |
| AVG FRUIT PER SQUARE METER: | 5.1 |
| AVG FRUIT PER PLANT: | 4.8 |
| TOTAL ESTIMATED WASTE FRUIT: | 1240KG |
| AVG LEAF SIZE: | 68CM$^2$ |
| AVG LEAF ORIENTATION: | X DEGREES |
| AVG LEAVES PER PLANT: | 97 |
| AVG STEM HEIGHT: | 2.8 M |
| AVG NUMBER BRANCHES PER PLANT: | 12 |

OBJECT TRACKING ACROSS MULTIPLE IMAGES

BACKGROUND

There is considerable interest in the agriculture industry to determine various aspects of crops for various purposes, such as yield estimation, breeding traits extraction, etc. One aspect of a crop that is of particular interest is a count of desired plant parts such as fruits, nuts, seeds, flowers, etc. Counts of desired plant parts obtained throughout a crop cycle can be used for a variety of purposes, such as projecting yields, diagnosing diseases or other causes of lower-than-expected yields, determining which farming techniques are most/least effective, extracting breeding traits, etc. However, manually counting plant-parts-of-interest can be cumbersome, e.g., due to some plant-parts-of-interest being obstructed by leaves and/or other obstacles. In many cases, manually counting is also impractical due to the potentially enormous numbers of plant-parts-of-interest that may be found among a field of plants.

Three-dimensional ("3D") models of objects such as plants are useful for myriad purposes, including but not limited to computational agriculture, as the 3D models can enable remote agronomy, remote plant inspection, remote breeding, and machine-driven trait extraction of key features such as fruit volume and fruit size. Capturing 3D image data natively on a large scale may be impractical for a variety of reasons, economical and/or technological. However, it is possible to derive 3D models using two-dimensional ("2D") images using 2D-to-3D techniques such as Structure from Motion ("SFM"). Accordingly, 2D vision sensors are often deployed for large scale data gathering, as would typically be more feasible for agricultural applications.

SUMMARY

Implementations disclosed herein are directed to utilizing various image processing techniques to facilitate tracking and/or counting of plant-parts-of-interest among crops. In various implementations, one or more two-dimensional ("2D") and/or three-dimensional ("3D") vision sensors may be moved relative to one or more plants to capture 2D and/or 3D vision data. For example, a sequence of digital images of one or more plants may be captured by a vision sensor of a robot while it is moved relative to the one or more plants.

In various implementations, the 2D and/or 3D vision data may be analyzed to track one or more objects, e.g., one or more plant-parts-of-interest, across multiple digital images. In this way, even if a given plant-part-of-interest is obscured in one digital image, it can still be matched across other digital image(s). By tracking plant-parts-of-interest across multiple digital images using techniques described herein, it is possible to obtain a reasonably accurate estimate of a number of plant-parts-of-interest present across one or more plants.

In some implementations, both 2D and 3D vision data may be analyzed to track plant-parts-of-interest across multiple images. For example, 3D data may be used to corroborate or refute objects tracked across 2D digital images, or vice versa. In some implementations, individual plant-part-of-interest may be matched, or identified as potential matches, across two or more 2D digital images, e.g., using bounding shapes. For example, techniques such as bipartite graph matching and/or the Hungarian algorithm may be employed to determine similarities between plant-parts-of-interest in one 2D digital image and potentially matching plant-parts-of-interest in another 2D digital image. Then, 3D vision data may be analyzed to confirm or refute the matches/similarities determined from the 2D vision data. For example, each plant-part-of-interest may be assigned a 3D Euclidian coordinate. When two plant-parts-of-interest are initially matched from the 2D data, their respective 3D Euclidian coordinates can be compared to corroborate or refute the initial match.

Capturing native 3D vision data, e.g., using 3D cameras, light detection and ranging ("LIDAR"), etc., can be impractical for various reasons, such as it being relatively expensive. However, it is possible to generate 3D data from multiple 2D digital images using techniques such as "structure from motion" processing. Accordingly, in some implementations, a sequence of 2D digital images of plant(s) may be captured, e.g., by a robot moving alongside the plant(s). This sequence of 2D digital images may be analyzed using structure from motion processing to generate 3D data. This 3D data may then be used to corroborate or refute initial matches determined from the 2D data.

In some implementations, what will be referred to herein as a "composite similarity score" may be calculated between two plant-parts-of-interest across two digital images using a plurality of what will be referred to herein as "constituent" similarity scores. For example, the 2D and 3D analysis described previously may generate, respectively, a 2D similarity score $sim_{2d}$ and a 3D similarity score $sim_{3d}$. These constituent similarity scores may be used in combination with each other and/or in combination with other constituent similarity scores described herein to calculate a composite similarity score between the two plant-parts-of-interest. In some implementations, the bipartite graph matching solution described previously may be employed using composite similarity scores, rather than 2D similarity scores alone.

The above is provided as an overview of some implementations disclosed herein. Further description of these and other implementations is provided below.

In some implementations, a method performed by one or more processors is provided that includes: obtaining a sequence of digital images of a plant captured by a vision sensor while the vision sensor is moved relative to the plant; analyzing a first digital image and a second digital image of the sequence to determine one or more measures of pixel movement across the first and second digital images; based on the one or more measures of pixel movement, predicting a first set of one or more bounding shapes surrounding one or more respective plant parts depicted in the second digital image; analyzing the second digital image of the sequence to detect a second set of one or more ground truth bounding shapes surrounding the one or more respective plant parts depicted in the second digital image; and based on a comparison of the first and second sets of bounding shapes, matching one or more of the respective plant parts depicted in the second digital image with one or more respective plant parts depicted in the first digital image.

In various implementations, the method may further include analyzing the first digital image of the sequence to identify an original set of one or more ground truth bounding shapes surrounding the one or more respective plant parts depicted in the first digital image. In various implementations, the predicting may be further based on the original set of one or more ground truth bounding shapes.

In various implementations, the matching may be based on a first similarity score generated based on the comparison. In various implementations, the matching may be further based on a second similarity score that is determined using bipartite graph matching on two-dimensional ("2D")

data contained in the first and second digital images. In various implementations, the matching may be further based on a second similarity score that is determined using three-dimensional ("3D") data representing the plant. In various implementations, the 3D data representing the plant is generated from structure-from-motion processing performed on the first and second digital images. In various implementations, the second similarity score is determined based on a distance between Euclidian coordinates associated with one or more of the respective plant parts depicted in the first digital image and one or more respective plant parts depicted in the second digital image.

In various implementations, the vision sensor may be moved relative to the plant by a robot. In various implementations, the one or more plant parts may include one or more fruits or flowers.

In another aspect, a method may include: obtaining a sequence of 2D digital images of a plant captured by a vision sensor while the vision sensor is moved relative to the plant; performing structure-from-motion processing on multiple digital images of the sequence to generate 3D data representing the plant; based on the 3D data representing the plant, determining one or more 3D similarity scores between one or more plant-parts-of interest depicted in a first digital image of the sequence and one or more plant-parts-of-interest in a second digital image of the sequence; calculating one or more composite similarity scores between one or more of the plant-parts-of interest depicted in the first digital image and one or more of the plant-parts-of-interest in the second digital image, wherein each of the composite similarity scores is based at least in part on one of the one or more 3D similarity scores; and based on the one or more composite similarity scores, matching one or more of the plant-parts-of-interest depicted in the second digital image with one or more respective plant-parts-of-interest depicted in the first digital image.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 5A and FIG. 5B depict an example of how the measures of pixel movement determined in FIG. 4 may be used to predict bounding shapes.

DETAILED DESCRIPTION

Figure 1:
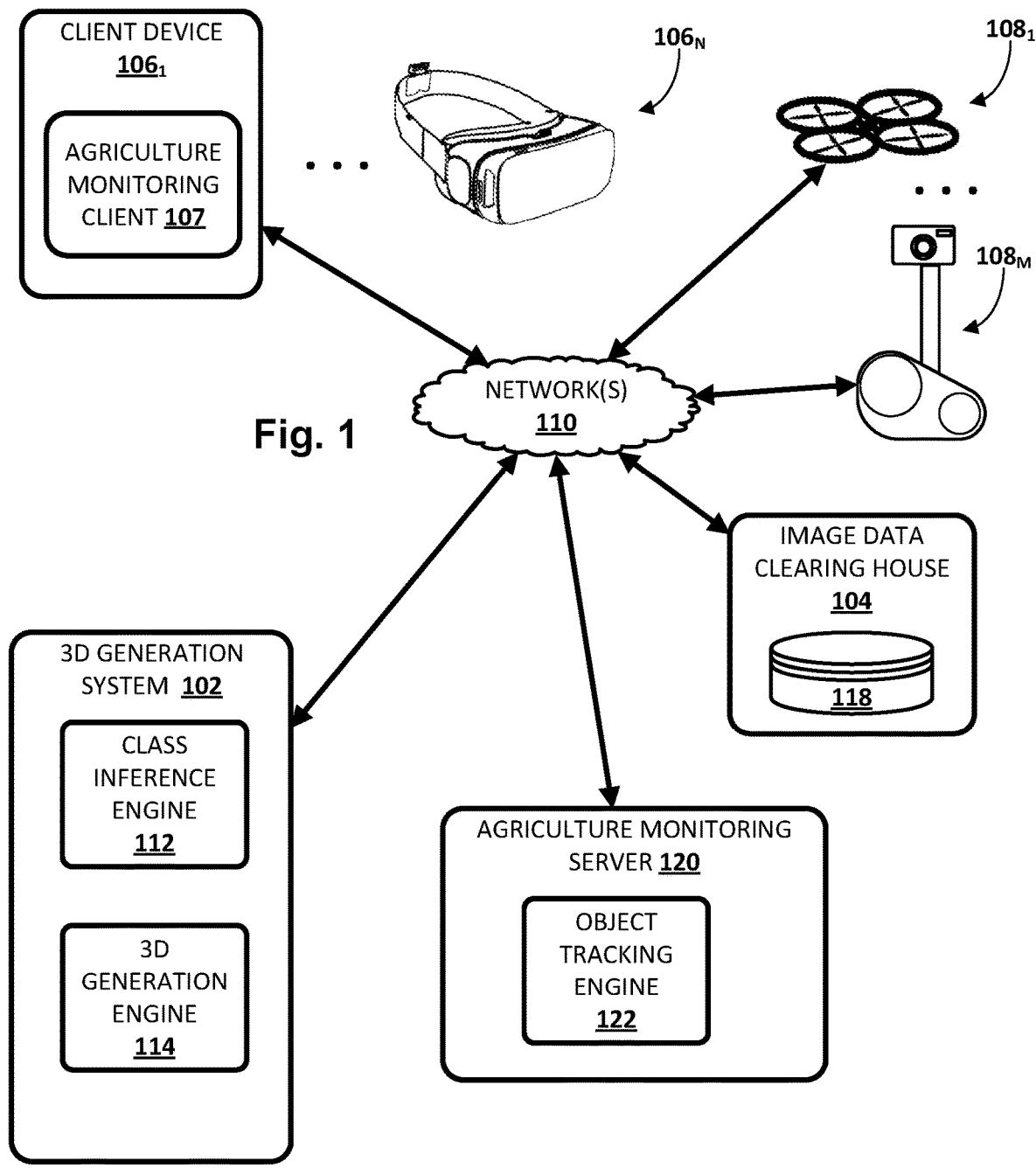
FIG. 1 schematically depicts an example environment in which disclosed techniques may be employed in accordance with various implementations.

FIG. 1 illustrates an environment in which one or more selected aspects of the present disclosure may be implemented, in accordance with various implementations. The example environment includes a plurality of client devices $106_{1-N}$, a 3D generation system 102, an image data clearing house 104, an agriculture monitoring server 120, and one or more sources of vision data $108_{1-M}$. Each of components $106_{1-N}$, 102, 104, 108, and 120 may communicate, for example, through a network 110. Agriculture monitor server 120 is an example of an information retrieval system in which the systems, components, and techniques described herein may be implemented and/or with which systems, components, and techniques described herein may interface.

An individual (which in the current context may also be referred to as a "user") may operate a client device 106 to interact with other components depicted in FIG. 1. Each component depicted in FIG. 1 may be coupled with other components through one or more networks 110, such as a local area network (LAN) or wide area network (WAN) such as the Internet. Each client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") that provides an augmented reality ("AR") or virtual reality ("VR") immersive computing experience, a "smart" watch, and so forth. Additional and/or alternative client devices may be provided.

Each of client devices 106, 3D generation system 102, image data clearing house 104, and agriculture monitoring server 120 may include one or more memories for storage of data and software applications, one or more processors for accessing data and executing applications, and other components that facilitate communication over a network. The operations performed by client device 106, 3D generation system 102, image data clearing house 104, and/or agriculture monitoring server 120 may be distributed across multiple computer systems. Each of 3D generation system 102, image data clearing house 104, and/or agriculture monitoring server 120 may be implemented as, for example, computer programs running on one or more computers in one or more locations that are coupled to each other through a network.

Each client device 106 may operate a variety of different applications that may be used, for instance, to perform agriculture analysis and/or to view statistics and/or other agricultural data that is generated using techniques described herein. For example, a first client device 106₁ operates agriculture monitoring client 107 (e.g., which may be stand-alone or part of another application, such as part of a web browser). Another client device 106N may take the form of a HMD that is configured to render 2D and/or 3D data to a wearer as part of a VR immersive computing experience. For example, the wearer of client device 106$_N$ may be presented with 3D point clouds representing various aspects of objects of interests, such as fruits of crops.

In various implementations, 3D generation system 102 may include a class inference engine 112 and/or a 3D generation engine 114. In some implementations one or more of engines 112 and/or 114 may be omitted. In some implementations all or aspects of one or more of engines 112 and/or 114 may be combined. In some implementations, one or more of engines 112 and/or 114 may be implemented in a component that is separate from 3D generation system 102. In some implementations, one or more of engines 112 and/or 114, or any operative portion thereof, may be implemented in a component that is executed by client device 106.

Class inference engine 112 may be configured to receive, e.g., from image data clearing house 104 and/or directly from data sources 108$_{1-M}$, a plurality of two-dimensional 2D images captured by one or more 2D vision sensors. In various implementations, the plurality of 2D images may capture an object having multiple classes of features. For example, the plurality of 2D images may capture a plant with classes of features such as leaves, fruit, stems, roots, soil, flowers, buds, panicles, etc.

Class inference engine 112 may be configured to filter data corresponding to a first set of one or more of the multiple classes of features from the plurality of 2D images to generate a plurality of filtered 2D images. In various implementations, the plurality of filtered 2D images may capture a second set of one or more features of the remaining classes of features. In the context of 2D images of a fruit-bearing plant, class inference engine 112 may filter data corresponding a set of classes other than fruit that are not necessarily of interest to a user, such as leaves, stems, flowers, etc., leaving behind 2D data corresponding to fruit.

In some implementations, class inference engine 112 may use one or more machine learning models trained to filter data corresponding to one or more feature classes from the 2D images. In some implementations, different machine learning models may be trained to identify different classes of features, or a single machine learning model may be trained to identify multiple different classes of features. In some implementations, the machine learning model(s) may be trained to generate output that includes pixel-wise annotations that identify each pixel as being a member of a particular feature class. For example, some pixels may be identified as "fruit," other pixels as "leaves," and so on. In some implementations, one or more machine learning models usable for such purposes may take the form of a convolutional neural network ("CNN") that is trained to perform semantic segmentation to classify pixels in image as being members of particular feature classes.

In some implementations, 3D generation system 102 may be configured to generate 3D vision data or 3D model(s) of depicted objects (e.g., plants, crops) from 2D vision data, e.g., native 2D data or 2D data that has been filtered by class inference engine 112. In some such implementations, 3D generation system 102 may employ techniques such as structure-from-motion ("SFM") to generate 3D data (e.g., 3D model, point cloud) from 2D vision data.

2D vision data may be obtained from various sources. In the agricultural context these data may be obtained manually by individuals equipped with cameras, or automatically using one or more robots 108$_{1-M}$ equipped with 2D vision sensors (M is a positive integer). Robots 108 may take various forms, such as an unmanned aerial vehicles 108₁, a wheeled robot 108$_M$, a robot (not depicted) that is propelled along a wire, track, rail or other similar component that passes over and/or between crops, or any other form of robot capable of being propelled or propelling itself past crops of interest. In some implementations, robots 108$_{1-M}$ may travel along lines of crops taking pictures at some selected frequency (e.g., every second or two, every couple of feet, every inch or few inches, etc.). Robots 108$_{1-M}$ may provide vision data they capture to image data clearing house 104. Image data clearing house 104 may include a database 118 that stores 2D and/or 3D vision data captured by any number of sources (e.g., robots 108).

In this specification, the term "database" and "index" will be used broadly to refer to any collection of data. The data of the database and/or the index does not need to be structured in any particular way and it can be stored on storage devices in one or more geographic locations. Thus, for example, the database 118 may include multiple collections of data, each of which may be organized and accessed differently.

Agriculture monitoring server 120 (and/or agriculture monitoring client 107) may be configured to perform selected aspects of the present disclosure to facilitate, among other things, analysis of statistics and/or other data generated by analyzing 2D and/or 3D vision data that captures crops. For example, in FIG. 1, agriculture monitoring server 120 includes an object tracking engine 122 that is configured to facilitate tracking of objects—particularly plant-parts-of interests like fruits, flowers, buds, etc.—across multiple different 2D digital images. In some implementations, object tracking engine 122 may determine similarity score(s) between a pair of objects depicted across two digital images and may determine whether the two depicted objects, in fact, depict the same object.

Figure 2:
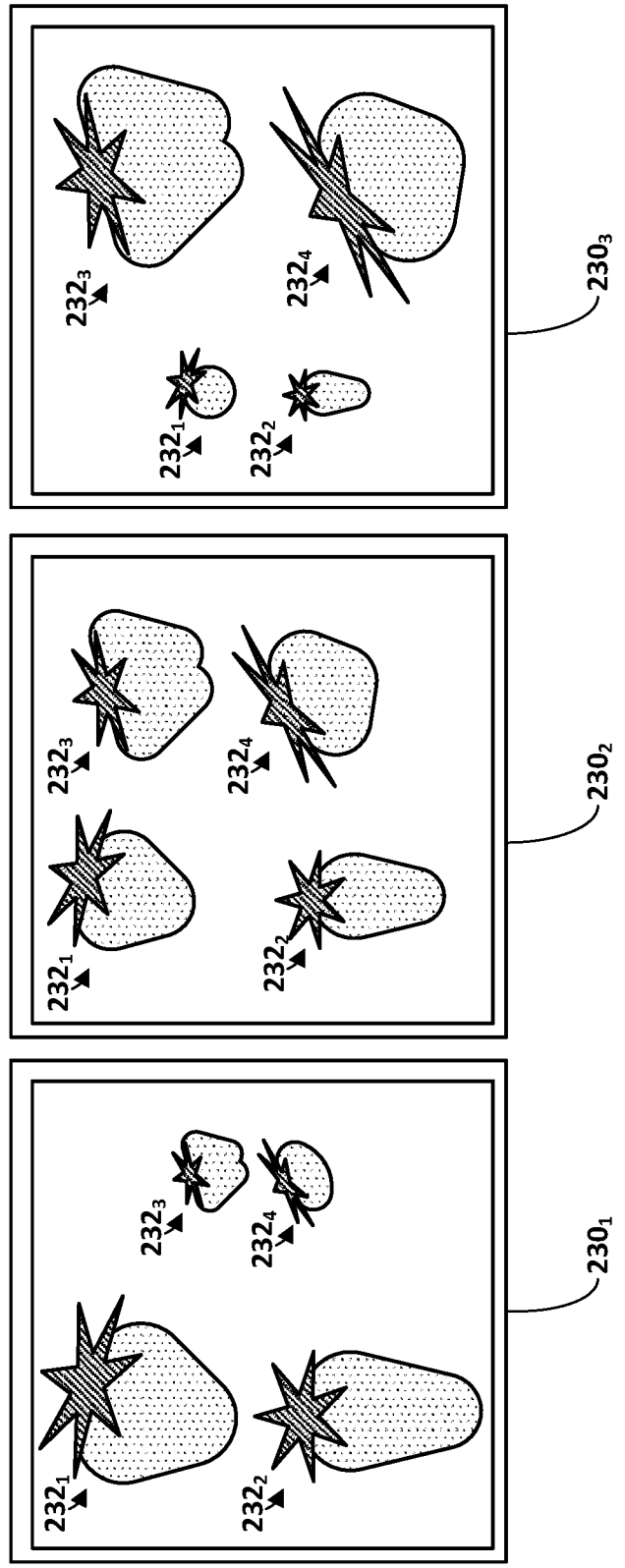
FIG. 2 depicts an example of a series of 2D digital images captured of a plurality of fruit, which can be processed using techniques described herein to perform object tracking.

FIG. 2 depicts a sequence of digital images 230$_{1-3}$ captured by a vision sensor (e.g., of a robot 108) while the vision sensor is moved relative to a strawberry plant. For the sake of brevity and simplicity, only fruits 232$_{1-4}$ of the strawberry plant are depicted in the sequence of digital images 230$_{1-4}$; other portions of the strawberry plant are not depicted. As used herein, strawberries will be described as "fruit," as opposed to "berries," because strawberries are technically considered aggregate accessory fruits. More generally, "plant-parts-of-interest" will be described herein as any part of a plant that is of interest to a user. Oftentimes these plant-parts of interest will be fruits, flowers, or nuts because these components are ultimately what has nutritional and/or commercial value. However, this is not meant to be limiting.

As shown in the sequence of digital images 230$_{1-4}$, as the vision sensor's perspective changes over time, the appearances of the individual fruit 232$_{1-4}$ also changes. For example, in first digital image 230₁, first and second fruits 232$_{1-2}$ appear larger than third and fourth fruits 232$_{3-4}$ because the vision sensor was closer to the former than the latter when first digital image 230₁ was captured. In second digital image 230₂, all four fruits appear similar in size because the vision sensor was approximately equidistant from them when second digital image 230₂ was captured. In third digital image 230₃, first and second fruits 232$_{1-2}$ appear smaller than third and fourth fruits 232$_{3-4}$ because the vision sensor was closer to the latter than the former when third digital image 230₃ was captured.

As shown in FIG. 2, individual plant-parts-of-interest such as strawberries may be fairly homogenous in appearance, especially to humans. This may make identifying individual plant-parts-of-interest across multiple digital images, or "object tracking," challenging. Object tracking may be even more difficult for more homogenous plant-parts-of-interest such as grapes. Accordingly, vision data such as digital images $230_{1-3}$ may be processed using techniques described herein to be able to match or track individual objects, such as fruits $232_{1-4}$, across multiple digital images $230_{1-3}$.

In some implementations, a variety of different techniques may be employed to generate a composite similarity score $sim_{composite}$ between a particular plant-part-of-interest (or more generally, an "object") across two or more different digital images. For example, a composite similarity score may be calculated for a strawberry depicted in two digital images of a sequence of digital images captured of a strawberry plant. If the composite similarity score satisfies some criteria or threshold, the two depicted strawberries may be determined, or "matched," as the same strawberry.

Figure 3:
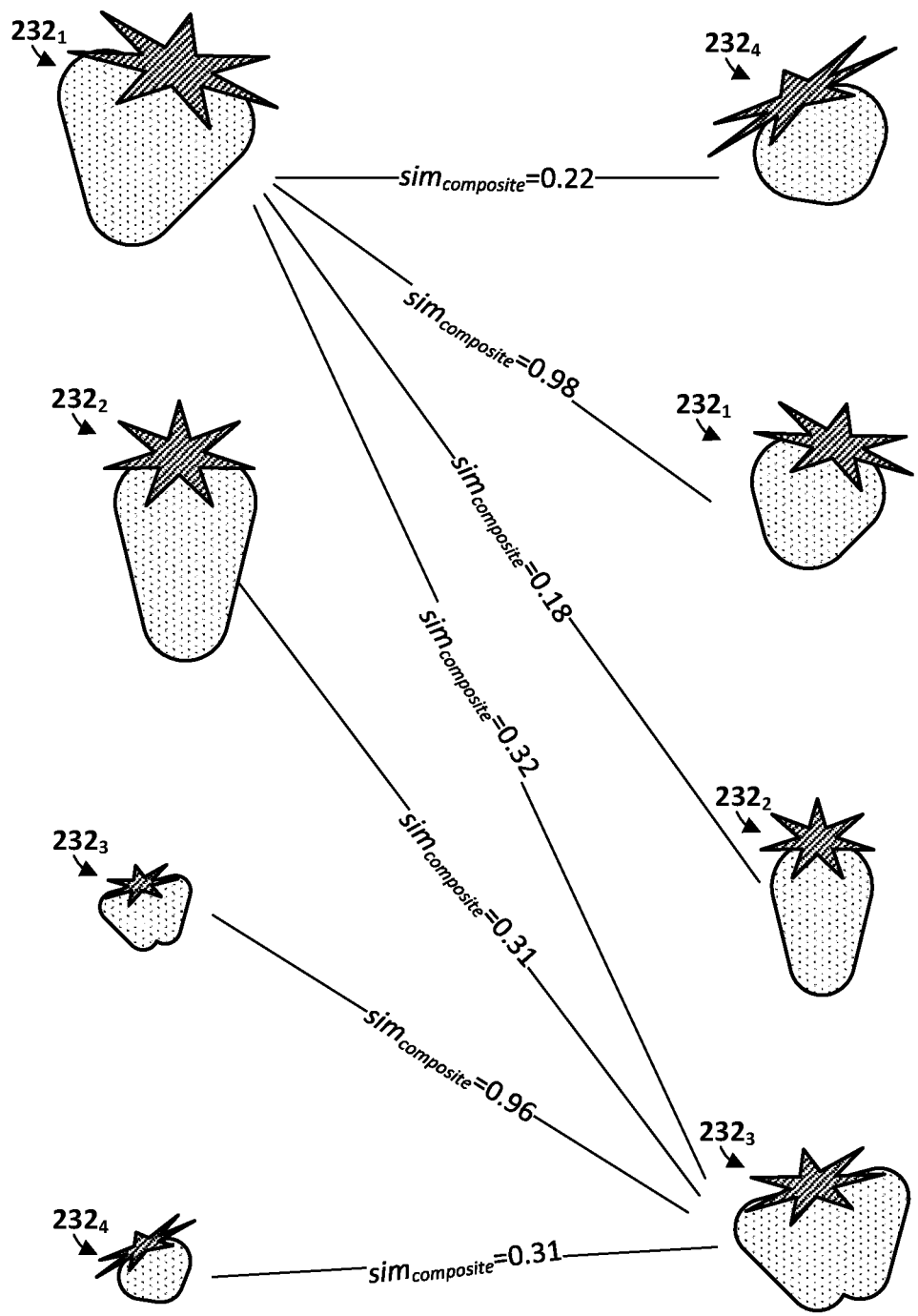
FIG. 3 depicts an example of how similarity scores determined for objects across multiple digital images may be used as part of bipartite graph matching for object tracking.

FIG. 3 depicts an example of how composite similarity scores calculated between candidate pairs of fruits 232 depicted in digital images $230_{1-3}$ may be used in various implementations to match individual fruits 232 between the digital images 230. In FIG. 3, the fruits $232_{1-4}$ on the left side are taken from first digital image $230_1$. The fruits $232_{1-4}$ on the right are taken from second digital image $230_2$, which as described depicted all the fruits as being similarly-sized. However, similar techniques may be used to match/track fruits across images $230_{2-3}$, or even from image $230_1$ to image $230_3$.

In some implementations, a bipartite graph matching problem may be formulated by creating edges between pairs of fruit to create candidate pairs of fruit. Composite similarity scores $sim_{composite}$ may be calculated for each candidate pair of fruits. Each edge may represent a similarity score $sim_{composite}$, and the pair of nodes connected by the edge may represent a pair of individual fruits (or bounding shapes detected around those fruit), as is depicted in FIG. 3. The goal of bipartite graph matching may be to find a set of edges for which the sum of selected edges' composite similarity scores can be maximized with a constraint that each node can only be matched at most once. Various techniques may be employed to solve this bipartite graph matching problem, such as the Hungarian algorithm.

In FIG. 3, four composite similarity scores $sim_{composite}$ are determined between first fruit $232_1$ on the left and the four fruit $232_{1-4}$ on the right. First fruit $232_1$ on the left is most similar in appearance to first fruit $232_1$ on the right, despite the difference in size. Accordingly, the edge between them has a composite similarity score of $sim_{composite}=0.98$, which on a scale of zero to one is a relatively high level of similarity. By contrast, the other three edges between first fruit $232_1$ on the left and the other three fruit $232_{2-4}$ on the right have lower composite similarity scores, e.g., $sim_{composite}=0.22$, $sim_{composite}=0.18$, and $sim_{composite}=0.32$.

Similarly, four edges are depicted between third fruit $232_3$ on the right and the four fruit $232_{1-4}$ on the left. Third fruit $232_3$ on the right is obviously most similar to its counterpart $232_3$ on the left, which is why the composite similarity score between them is $sim_{composite}=0.96$. Third fruit $232_3$ is less similar to the other fruit $232_{1-2,4}$, and therefore those edges have smaller composite similarity values of, respectively, $sim_{composite}=0.32$, $sim_{composite}=0.31$, and $sim_{composite}=0.31$.

Composite similarity scores may be determined between the other fruits, but are not depicted in FIG. 3 for the sakes of clarity and brevity. While four fruit $232_{1-4}$ are depicted in FIGS. 2-3, this is not meant to be limiting. In various implementations, any number of fruit may be depicted across a sequence of digital images. Moreover, there is no requirement that each fruit be represented in any given pair of images. For example, a fruit may move out of a vision sensor's field of view from one image to the next.

In some implementations, the composite similarity score $sim_{composite}$ calculated for a given pair of object depictions across different digital images, such as a pair of fruit depictions, may be determined using an equation such as the following:

$$sim_{composite}=w_1 \times nor(sim_{2d}+1)+w_2 \times nor(sim_{3d}+1)+w_3 \times nor(sim_x+1)+w_4 \times nor(sim_y+1)+w_5 \times nor(sim_{box}+1) \quad (1)$$

The weights $w_{1-5}$ may represent weight factors that may be selected in various ways. "nor" represents a normalization function. And $sim_{composite}$ may be a composite of what will be referred to herein as "constituent" similarity scores, which in this example include $sim_{2d}$, $sim_{3d}$, $sim_x$, $sim_y$, and $sim_{box}$. In some examples described herein, all of these constituent similarity scores are used to calculate the composite similarity score $sim_{composite}$. However, this is not meant to be limiting. In other implementations, various combinations of less than all of the constituent similarity scores may be used instead. Moreover, these constituent similarity scores are not meant to be limiting, and other constituent similarity scores are contemplated.

In some implementations, one or more of the constituent similarity scores may be calculated first for a given pair of objects depicted across two images. If those one or more constituent similarity scores satisfy some minimum threshold (e.g., 0.9), then the analysis may end and the two objects may be determined to be a match. However, if those one or more constituent similarity scores fail to satisfy the minimal threshold, then one or more additional constituent similarity scores may be calculated, e.g., to corroborate or refute the previously-calculated constituent similarity scores. In some implementations, if all constituent similarity scores are calculated and yet the minimal threshold is still not satisfied, then a result of "inconclusive" or the like may be raised. Additionally or alternatively, composite similarity scores may be calculated between one object of the inconclusive pair and other objects not part of the pair, to determine whether a better match can be found.

The term $sim_{2d}$ represents a similarity calculated between the objects across the two or more digital images using 2D data. A similarity score $sim_{2d}$ may be determined in various ways. In some implementations, a similarity score $sim_{2d}$ between a pair of depictions of objects-of-interest across two digital images may be determined by detecting bounding shapes around those objects-of-interest. Various feature points within the bounding shapes, such as edges, volumes, shapes, patterns, gradients, sizes, textures, colors, visible feature counts, etc., may then be compared to determine a similarity between the contents of the two respective bounding shapes. As one non-limiting example, when two depictions of a strawberry are compared to determine whether they are a match, counts of visible achenes, humps, and/or leaves of each depicted strawberry may be extracted.

In some implementations, an equation such as the following may be used to determine $sim_{2d}$, with n being a number of matched feature points:

$$sim_{2d} = \sum_i^n \frac{1}{u_i} \quad (2)$$

In various implementations, $u_i$ may represent an uncertainty value for the ith feature point.

As used herein, a "bounding shape" may take various forms, such as a rectangle, square, circle, ellipse, polygon, triangle, or any other shape that can be imposed to surround a given detected object of interest. In some implementations, the type of bounding shape used may depend on the object of interest. For example, some plant-parts-of-interest such as bananas or green beans may be elongate, and may be captured using elongate rectangles or ellipses. Other plant-parts-of-interest such as individual grapes or strawberries may be captured using other shapes, such as circles, triangles, etc. In other implementations, irregular shapes may be detected about plant-parts-of-interest.

In some implementations, 2D data contained within two bounding shapes may be compared using a trained machine learning model. For example, in some implementations, a convolutional neural network may be trained using techniques such as triplet loss to generate 2D similarity scores ($sim_{2d}$) between pairs of depicted fruits. Additionally or alternatively, other machine learning techniques may be used to match data within pairs of bounding shapes, such as calculating a Euclidian distance between the raw image data, calculating the Euclidian distance between reduced-dimensionality data (e.g., using an encoder portion of a de-noising autoencoder), scale invariant features transform ("SIFT"), speeded up robust features ("SURF"), features from accelerated segment test ("FAST"), keypoint matching, object recognition, and so forth.

The term $sim_{3d}$ represents a similarity calculated between the objects across the two or more digital images using 3D data. For example, the Euclidian distance between the object's locations in the pair of images may be calculated. The closer the points, the more likely the depicted objects match. For example, a set of 3D coordinates (x, y, z) may be calculated for each fruit of a pair of cross-image fruits under consideration. A reciprocal of the distance between this pair of 3D coordinates may represent a similarity $sim_{3d}$ between the pair of 3D coordinates. Put another way, in some implementations, an equation such as the following may be used to calculate $sim_{3d}$, with "dist" representing a Euclidian distance between points p1 and p2:

$$sim_{3d} = \frac{1}{dist(p1, p2)} \quad (3)$$

One advantage of 3D object tracking is that it is easier to match objects across non-adjacent digital images of a sequence of digital images than it is in 2D object tracking. In particular, the two objects' 3D coordinates can be compared to see if they are close enough to each other in Euclidian space to be potentially separate depictions of the same object. If they are too far away from each other, they can be eliminated as a potential match, e.g., before any other potentially complex calculations to determine any of the other constituent similarity scores are performed.

The terms $sim_x$ and $sim_y$ may represent similarities between a prediction of where a bounding shape encompassing the object-to-be-matched will be and an actual location of the bounding shape. The prediction may be based at least in part on "measures of pixel" movement determined between the two images. An example of how these values may be calculated will be demonstrated in FIGS. 4-5. In some implementations, $sim_x$ and $sim_y$ may be calculated with an equation such as the following, with $x_{movement}$ and $y_{movement}$ representing measures of pixel movement in the x and y directions, respectively:

$$sim_x = \frac{\text{image width}}{\text{abs}(x_1 + x_{movement} - x_2)} \quad (4)$$

$$sim_y = \frac{\text{image height}}{\text{abs}(y_1 + y_{movement} - y_2)} \quad (5)$$

The term $sim_{box}$ may operate similarly to the terms $sim_x$ and $sim_y$, except that $sim_{box}$ may be determined by comparing a predicted size of a bounding shape around the object to a ground truth bounding shape around the object, rather than predicted verses ground truth positions of the bounding shape. For example, in some implementations, $sim_{box}$ may be calculated using an equation such as the following:

$$sim_{box} = \frac{boxwidth_1 + boxwidth_2}{\text{abs}(boxwidth_1 - boxwidth_2)} + \frac{boxheight_1 + boxheight_2}{\text{abs}(boxheight_1 - boxheight_2)} \quad (6)$$

Figure 4:
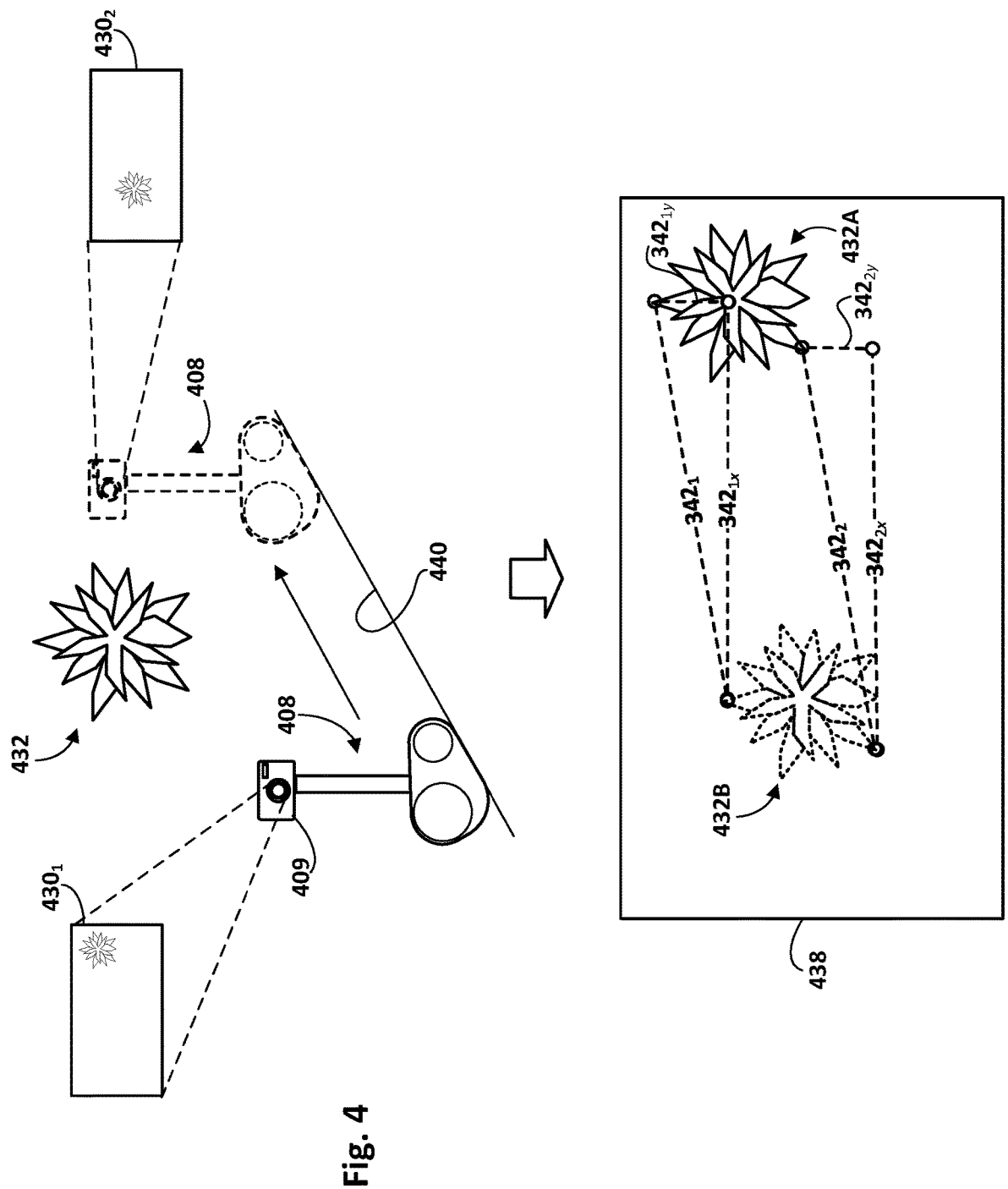
FIG. 4 depicts an example of how a robot may capture multiple digital images of a plant, and how those digital images may be processed to determine one or more measures of pixel movement across the digital images.

FIGS. 4 and 5 demonstrate one example of how the terms $sim_x$ and $sim_y$ may be determined. In FIG. 4, a robot 408 equipped with a vision sensor 409 travels up a slope 440 in the direction shown by the arrow. For this example, assume vision sensor 409 is configured to capture 2D digital images. At a first point in time represented by robot drawn in solid lines near the bottom of slope 440, robot 408 operates vision sensor 409 to capture a first digital image 430$_1$. At a second point in time represented by robot drawn in dashed lines near the top of slope 440, robot 408 operates vision sensor 409 to capture a second digital image 430$_2$. As5 shown in FIG. 4, the respective digital images 430$_{1-2}$ captured at these points in time will depict two different perspectives of a plant 432. In first image 430$_1$, plant 432 is near the top right, whereas in second image 430$_2$, plant 432 has moved down and to the left within the image. These relative positions of plant within images 430$_{1-2}$ represent the robot's perspective of plant 432 at those different points in time.

A field-of-view ("FOV") 438 of vision sensor 409 is depicted schematically at the bottom of FIG. 4. Digital images captured by vision sensor 409 may have the same dimensions as FOV 438 in some instances. A depiction of plant 432 is shown at two different positions within FOV 438 to demonstrate the different positions within digital images 430$_{1-2}$ that plant 432 was visible as robot 408 traversed up slope 440. A first representation of plant 432A is shown in solid lines as representing the view of plant 432 by vision sensor 409 when robot 408 was near the bottom of slope 440, i.e. in first digital image 430$_1$. A second representation of plant 432B is shown in dashed lines as representing the view of plant 432 by vision sensor 409 later, when robot 408 was near the top of slope 440, i.e. in second digital image 430$_2$.

In various implementations, one or more measures of pixel movement may be determined across first and second digital images 430$_{1-2}$ captured at these moments. These measure(s) of pixel movement may then be used in various implementations to predict the location and/or size of a bounding shape about an object-of-interest in one of the digital images. Then, difference(s) between the predicted bounding shape and an actual, ground truth bounding shape detected around the object-of-interest may be determined. The greater the distance(s), the less likely the objects are the same.

In FOV 438 of FIG. 4, two pairs of matching pixels between representations 432A-B are identified by the lines $342_1$ and $342_2$. The first line $342_1$ connects matching pixels at the top of plant 432 across representations 432A-B. The second line $342_2$ connects matching pixels at the bottom left of plant 432 across representations 432A-B. In some implementations, x and y components of lines $342_{1-2}$ may be determined, e.g., as separate measures of pixel movement in the x and y directions (or more generally, horizontal and vertical directions). Thus, in FIG. 4, $342_{1x}$ and $342_{1y}$ are calculated for first line $342_1$. Similarly, $342_{2x}$ and $342_{2y}$ are calculated for second line $342_2$. Two pixel matches are shown in FIG. 4 for the sakes of brevity and simplicity. It is contemplated that in many cases, far more pixel matches may be identified and used to compute measures of pixel movement across two images.

In some implementations, a mean or median of all pixel movements in a given direction (e.g., x or y) may be calculated and used as an overall measure of pixel movement in that direction. For instance, in FIG. 4, $(342_x + 342_{2x})/2$ may be used as the overall measure of pixel movement $x_{movement}$ in the x direction, and $(342_{1y}+342_{2y})/2$ may be used as the overall measure of pixel movement $y_{movement}$ in the y direction. These measures of pixel movement may be used in equations such as equations (4) and (5) above.

A demonstration of how the overall measures of pixel movement may be utilized is depicted in FIGS. 5A-B. In FIGS. 5A and B, two sequence of two digital images, $530_{1-2}$ and $530_{1-3}$, respectively, are depicted. Each of digital images $530_{1-3}$ captures a single fruit 532. Assume for these examples that the same measures of pixel movement have been calculated as were calculated for FIG. 4.

FIG. 5A represents an example of where a predicted bounding shape is sufficiently close to a ground truth bounding shape to determine that the same fruit $532_1$ is depicted in both digital images $530_{1-2}$. More particularly, a ground truth bounding shape $550_{GT}$ is detected around fruit $532_1$ in first digital image $530_1$, e.g., using techniques such as edge detection, a machine learning model such as a convolutional neural network trained to identify the object type, etc.

Based on the measure(s) of movement and on x and y coordinates associated with any point of ground truth bounding shape $550_{GT}$ (e.g., in its middle, corner, edge-middle, etc.), a prediction may be made of where and/or how big a predicted bounding shape $552_P$ should be in second digital image $530_2$. For example, the location in the x direction of predicted bounding shape $532_P$ may be determined from the part of equation (4) above, $x_1 + x_{movement}$. Similarly, the location in the y direction of predicted bounding shape $532_P$ may be determined from the part of equation (5) above, $y_1 + y_{movement}$.

A location of predicted bounding shape $532_P$ may be compared to a location of another ground truth bounding shape $552_{GT}$ detected around fruit $532_1$ in second digital image $530_2$, e.g., using equations (4) and (5) above. The closer predicted bounding shape $552_P$ is to ground truth bounding shape $552_{GT}$, the more likely the fruit $532_1$ depicted in both of images $530_{1-2}$ match.

FIG. 5B represents an alternative example, which compares first digital image $530_1$ with a different, third digital image, $530_3$. In this example, predicted bounding shape $552_P$ is in the same location in image $530_3$ as it was in image $530_2$. However, a different fruit $532_2$ is depicted at a different location in image $530_2$ than was depicted in images $530_{1-2}$. Consequently, $sim_x$ and $sim_y$ may be relatively low because predicted bounding shape $552_P$ is relatively far away from another ground truth bounding shape $554_{GT}$ detected around fruit $532_2$. Thus, in the example of FIG. 5B, fruits $532_1$ and $532_2$ would not be a match.

Figure 6:
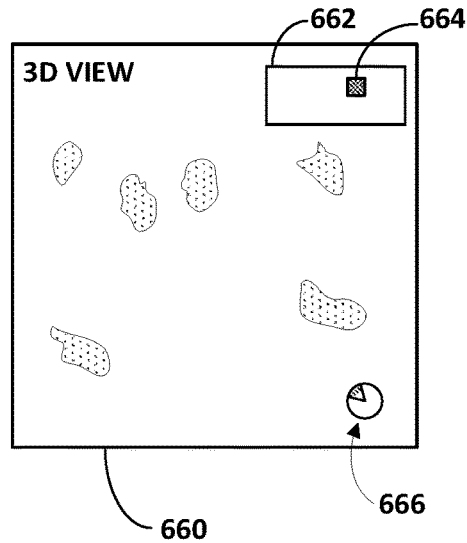
FIG. 6 depicts an example graphical user interface ("GUI") that may be provided to facilitate techniques described herein.

FIG. 6 depicts an example graphical user interface ("GUI") 600 that may be rendered to allow a user to initiate and/or make use of techniques described herein. GUI 600 includes a 3D navigation window 660 that is operable to allow a user to navigate through a virtual 3D rendering of an area of interest, such as a field. The blobs shown in window 660 represent plant-parts-of-interest tracked using techniques described herein. A map graphical element 662 depicts outer boundaries of the area of interest, while a location graphical indicator 664 within map graphical element 662 depicts the user's current virtual "location" within the area of interest. The user may navigate through the virtual 3D rendering, e.g., using a mouse or keyboard input, to view different parts of the area of interest. Location graphical indicator 664 may track the user's "location" within the entire virtual 3D rendering of the area of interest.

Another graphical element 666 may operate as a compass that indicates which direction within the area of interest the user is facing, at least virtually. A user may change the viewing perspective in various ways, such as using a mouse, keyboard, etc. In other implementations in which the user navigates through the 3D rendering immersively using a HIVID, eye tracking may be used to determine a direction of the user's gaze, or other sensors may detect when the user's head is turned in a different direction. Either form of observed input may impact what is rendered on the display(s) of the HIVID.

GUI 600 also includes statistics about various feature classes of the observed crops. These statistics may be compiled for particular feature classes in various ways. For example, in some implementations, data generated at least in part using object tracking techniques described herein may be used to determine various statistics about plant-parts-of-interest. In FIG. 6, GUI 600 includes statistics related to detected fruit, such as total estimated fruit volume, average fruit volume, average fruit per square meter (or other distance unit, may be user-selectable), average fruit per plant, total estimated culled fruit (e.g., fruit detected that has fallen onto the ground), and so forth. Of course, these are just examples and are not meant to be limiting. Statistics are also provided for other feature classes, such as leaves, stems, and branches. Other statistics may be provided in addition to or instead of those depicted in FIG. 600, such as statistics about buds, flowers, panicles, etc.

Figure 7:
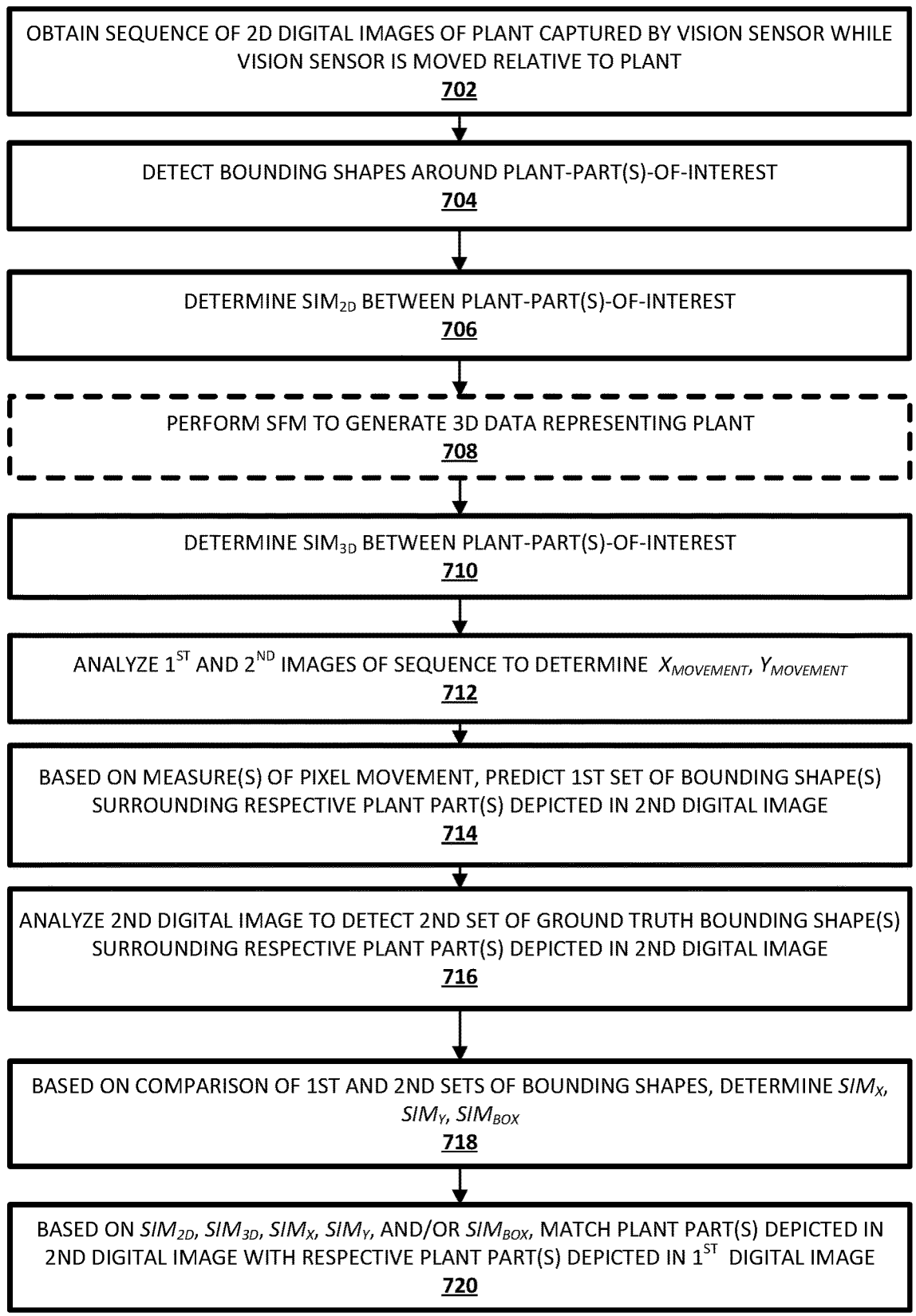
FIG. 7 depicts a flowchart of example methods in accordance with various implementations described herein.

FIG. 7 illustrates a flowchart of an example method 700 for practicing selected aspects of the present disclosure. The operations of FIG. 7 can be performed by one or more processors, such as one or more processors of the various computing devices/systems described herein, such as by agriculture monitoring server 120. For convenience, operations of method 700 will be described as being performed by a system configured with selected aspects of the present disclosure. Other implementations may include additional steps than those illustrated in FIG. 7, may perform step(s) of FIG. 7 in a different order and/or in parallel, and/or may omit one or more of the steps of FIG. 7.

At block 702, the system may obtain, e.g., from image data clearing house 104, a sequence of digital images of a plant captured by a vision sensor (e.g., 409) while the vision sensor is moved, e.g., by a robot 108, relative to the plant. At block 704, the system may analyze a first digital image and a second digital image of the sequence to detect ground truth bounding shapes around one or more plant-parts-of-interest in first and second digital images of the sequence.

At block 706, the system may determine 2D similarity measure(s) sim2d between one or more of the plant-parts-of-interest across the first and second digital images. For example, feature points within each ground truth bounding shape detected in the first image at block 704 may be compared to feature points detected within each bounding shape detected in the second image at block 704. In some implementations, if $sim_{2d}$ between two particular plant-parts-of-interest across the first and second digital images satisfies some minimum threshold, such as 0.9, the analysis for that particular pair of plant-parts-of-interest may end, and a match may be found between that particular pair. In some implementations, the 2D similarity scores for multiple pair of plant-parts-of-interest may be used to formulate a bipartite graph matching solution as described previously, with each edge representing a $sim_{2d}$ score. Other constituent similarity scores (e.g., $sim_{3d}$, $sim_x$, $sim_y$, $sim_{box}$) may be used to corroborate or refute the conclusions of the bipartite graph matching solution. In other implementations, various constituent similarity scores may be used with an equation such as equation (1) above to calculate composite similarity scores $sim_{composite}$, and those composite similarity scores are used as edges in the bipartite graph matching solution.

At optional (as indicated by the dashed lines) block 708, the system, e.g., by way of 3D generation engine 114, may perform SFM processing on the first and second digital images (and more images of the sequence if available and desired) to generate 3D data, such as a 3D model or a 3D point cloud, that represents the plant. In other implementations in which 3D vision sensors are available, native 3D data may be employed instead and block 708 may be omitted. At block 710, the system may determine $sim_{3d}$ between one or more plant-parts-of-interest across the two digital images based on the 3D data. In some implementations, $sim_{3d}$ may be used to corroborate or refute a provisional match determined based on $sim_{2d}$ between a pair of plant-parts-of-interest. And as before, in some implementations, if $sim_{3d}$—alone or combined with $sim_{2d}$—satisfies some minimal threshold, then the analysis may end and a match may be found.

At block 712, the system may analyze the first and second digital images to determine one or more measures of pixel movement (e.g., $x_{movement}$, $y_{movement}$) across the first and second digital images. Based on the one or more measures of pixel movement, at block 714, the system may predict a first set of one or more bounding shapes surrounding one or more respective plant parts depicted in the second digital image (or in the first image). As noted above, the predicted bounding shapes may also be predicted based at least in part on the ground truth bounding shapes detected at block 704. Examples of predicted bounding shapes were shown at $552_P$ in FIGS. 5A and 5B.

At block 716, the system may analyze the second digital image of the sequence to detect a second set of one or more ground truth bounding shapes surrounding the one or more respective plant parts depicted in the second digital image. Examples of ground truth bounding shapes were indicated at $552_{GT}$ and $554_{GT}$ in FIGS. 5A-B. Based on a comparison of the first and second sets of bounding shapes, at block 718, the system may determine one or more of $sim_x$, $sim_y$, and/or $sim_{box}$, as described previously, e.g., using equations (4)-(5).

At block 720, the system may match one or more of the respective plant parts depicted in the second digital image with one or more respective plant parts depicted in the first digital image based on two or more of the constituent similarity scores calculated previously, such as two or more of $sim_{2d}$, $sim_{3d}$, $sim_x$, $sim_y$, and/or $sim_{box}$. In some implementations, the system may formulate a bipartite graph matching problem as described previously with respect to FIG. 3, with the composite similarity scores $sim_{composite}$ used as edges. In some implementations, an equation such as equation (1) above, which utilized all the aforementioned constituent similarity scores, may be used to calculate $sim_{composite}$. In other implementations, less than all of the constituent similarity scores may be used to calculate $sim_{composite}$.

While examples described herein have related to crops and plants, this is not meant to be limiting, and techniques described herein may be applicable for any type of object that is captured across sequences of digital images. For example, techniques described herein may be used in various manufacturing processes, surveillance operations, rescue operations, disaster relief operations, insurance investigations, and so forth.

Figure 8:
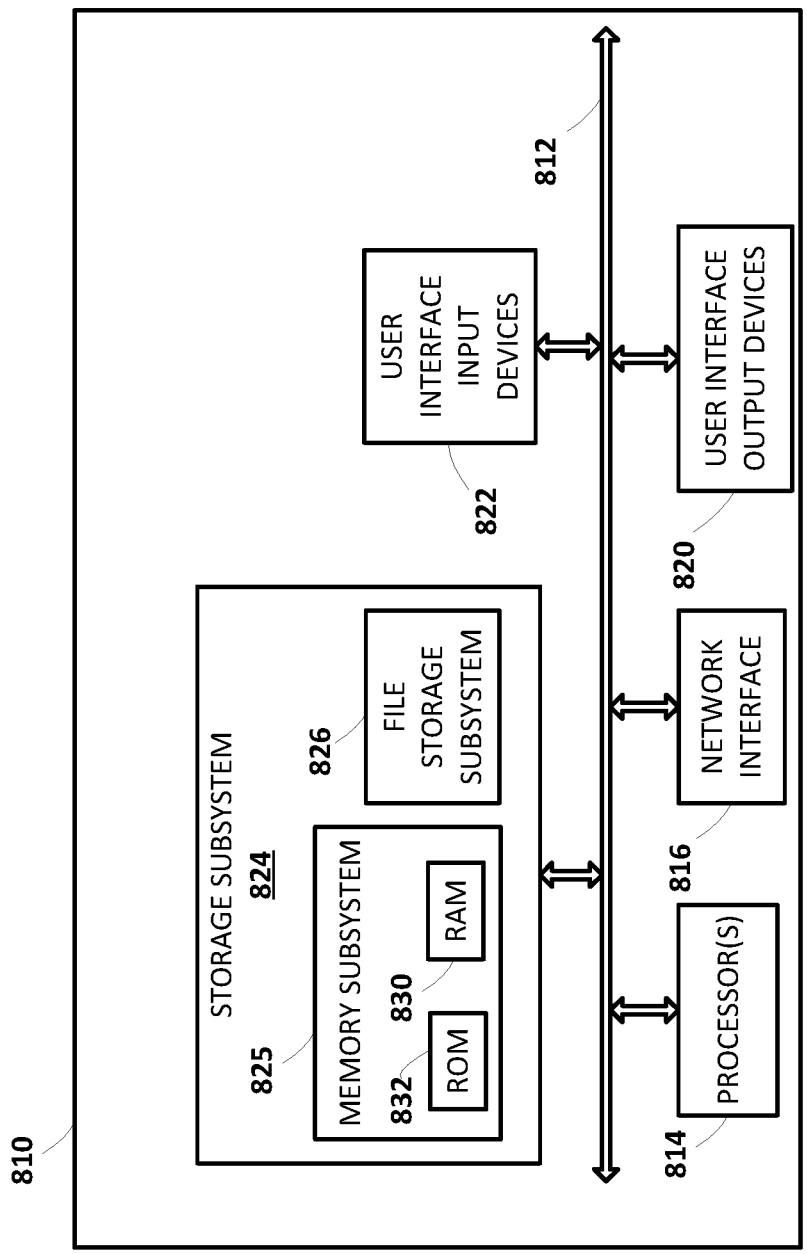
FIG. 8 schematically depicts an example architecture of a computer system.

FIG. 8 is a block diagram of an example computing device 810 that may optionally be utilized to perform one or more aspects of techniques described herein. Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In some implementations in which computing device 810 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HIVID, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the method described herein, as well as to implement various components depicted in FIG. 1.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:

obtaining a sequence of digital images of a plant captured by a vision sensor while the vision sensor is moved relative to the plant;

analyzing a first digital image and a second digital image of the sequence, wherein the analyzing includes:

determining one or more measures of pixel movement across the first and second digital images, and processing the first digital image based on a machine learning model to detect an original set of one or more bounding shapes surrounding one or more respective plant parts depicted in the first digital image;

based on the original set of one or more bounding shapes and the one or more measures of pixel movement, predicting a first set of one or more bounding shapes surrounding one or more of the respective plant parts depicted in the second digital image;

analyzing the second digital image of the sequence based on the machine learning model to detect a second set of one or more bounding shapes surrounding the one or more of the respective plant parts depicted in the second digital image;

calculating a size similarity score by comparing a predicted size of a given predicted bounding shape of the first set of one or more predicted bounding shapes to a detected size of a given detected bounding shape of the second set of one or more detected bounding shapes;

calculating a position similarity score by comparing a predicted position of the given predicted bounding shape to a detected position of the given detected bounding shape; and based on both the size and position similarity scores, matching one or more of the respective plant parts depicted in the second digital image with one or more of the respective plant parts depicted in the first digital image.

2. The method of claim 1, wherein the matching is further based on another similarity score that is determined using bipartite graph matching on two-dimensional ("2D") data contained in the first and second digital images.

3. The method of claim 1, wherein the matching is further based on another similarity score that is determined using three-dimensional ("3D") data representing the plant.

4. The method of claim 3, wherein the 3D data representing the plant is generated from structure-from-motion processing performed on the first and second digital images.

5. The method of claim 3, wherein the another similarity score is determined based on a distance between Euclidian coordinates associated with one or more of the respective plant parts depicted in the first digital image and one or more respective plant parts depicted in the second digital image.

6. The method of claim 1, wherein the vision sensor is moved relative to the plant by a robot.

7. The method of claim 1, wherein the one or more plant parts comprise one or more fruits or flowers.

8. A system comprising one or more processors and memory storing instructions that, in response to execution of the instructions by the one or more processors, cause the one or more processors to:

obtain a sequence of digital images of a plant captured by a vision sensor while the vision sensor is moved relative to the plant;

perform analysis of a first digital image and a second digital image of the sequence, wherein the analysis includes:

determining one or more measures of pixel movement across the first and second digital images, and processing the first digital image based on a machine learning model to detect an original set of one or more bounding shapes surrounding one or more respective plant parts depicted in the first digital image;

based on the original set of one or more bounding shapes and the one or more measures of pixel movement, predict a first set of one or more bounding shapes surrounding one or more of the respective plant parts depicted in the second digital image;

analyze the second digital image of the sequence based on the machine learning model to detect a second set of one or more bounding shapes surrounding the one or more of the respective plant parts depicted in the second digital image;

calculate a size similarity score based on a comparison of a predicted size of a given predicted bounding shape of the first set of one or more predicted bounding shapes to a detected size of a given predicted bounding shape of the second set of one or more detected bounding shapes;

calculate a position similarity score by comparing a predicted position of the given predicted bounding shape to a detected position of the given detected bounding shape; and based on both the size and position similarity scores, match one or more of the respective plant parts depicted in the second digital image with one or more of the respective plant parts depicted in the first digital image.

9. The system of claim 8, wherein the match is further based on another similarity score that is determined using three-dimensional ("3D") data representing the plant.

10. At least one non-transitory computer-readable medium comprising instructions that, in response to execution of the instructions by one or more processors, cause the one or more processors to:

obtain a sequence of digital images of a plant captured by a vision sensor while the vision sensor is moved relative to the plant;

perform analysis of a first digital image and a second digital image of the sequence, wherein the analysis includes:

determining one or more measures of pixel movement across the first and second digital images, and processing the first digital image based on a machine learning model to detect an original set of one or more bounding shapes surrounding one or more respective plant parts depicted in the first digital image;

based on the original set of one or more bounding shapes and the one or more measures of pixel movement, predict a first set of one or more bounding shapes surrounding one or more of the respective plant parts depicted in the second digital image;

analyze the second digital image of the sequence based on the machine learning model to detect a second set of one or more bounding shapes surrounding the one or more of the respective plant parts depicted in the second digital image;

calculate a size similarity score based on a comparison of a predicted size of a given predicted bounding shape of the first set of one or more predicted bounding shapes to a detected size of a given predicted bounding shape of the second set of one or more detected bounding shapes;

calculate a position similarity score by comparing a predicted position of the given predicted bounding shape to a detected position of the given detected bounding shape; and based on both the size and position similarity scores, match one or more of the respective plant parts depicted in the second digital image with one or more of the respective plant parts depicted in the first digital image.

11. The at least one non-transitory computer-readable medium of claim 10, wherein the match is further based on another similarity score that is determined using three-dimensional ("3D") data representing the plant.

\* \* \* \* \*